July 9, 1940.  H. D. COLMAN  2,207,051

CLUTCH MECHANISM

Filed Aug. 15, 1938  2 Sheets-Sheet 1

INVENTOR
Howard D. Colman
BY
ATTORNEYS

July 9, 1940.   H. D. COLMAN   2,207,051
CLUTCH MECHANISM
Filed Aug. 15, 1938   2 Sheets-Sheet 2
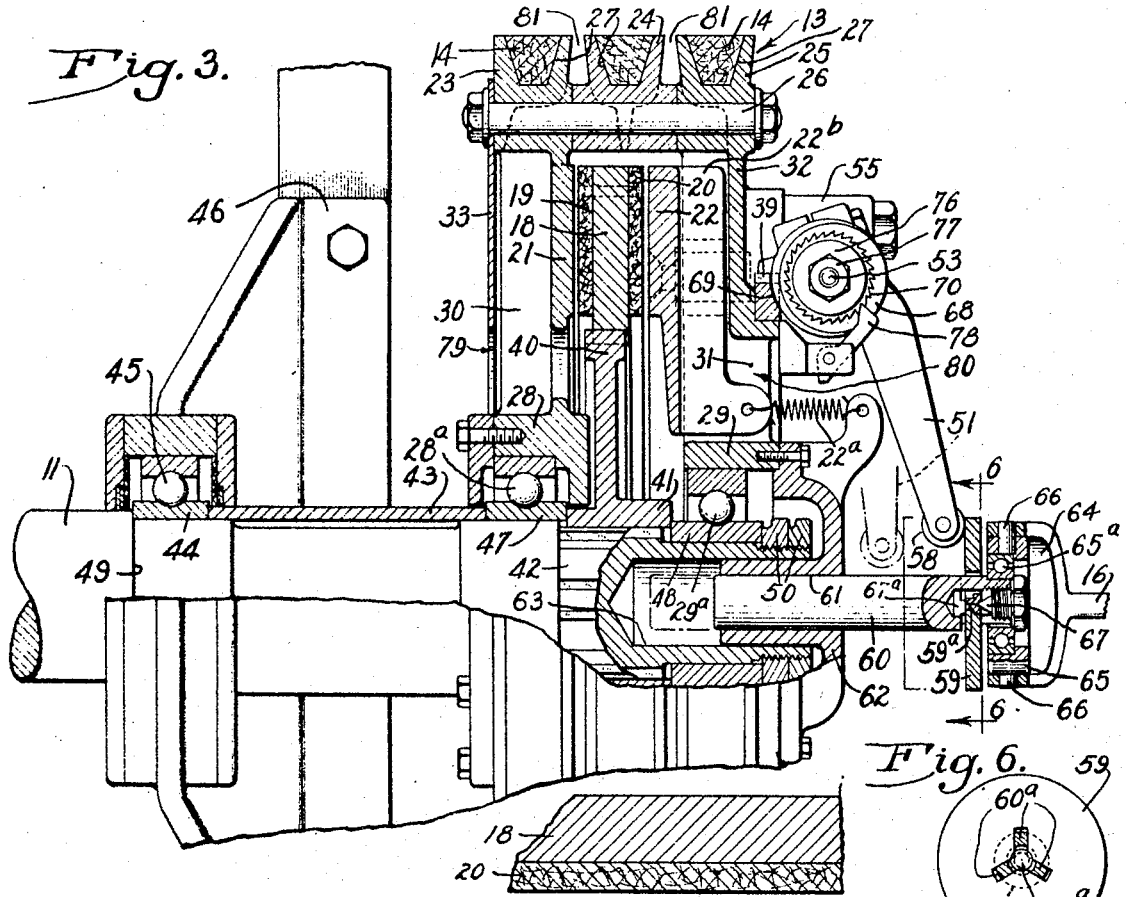
Fig. 3.
Fig. 6.
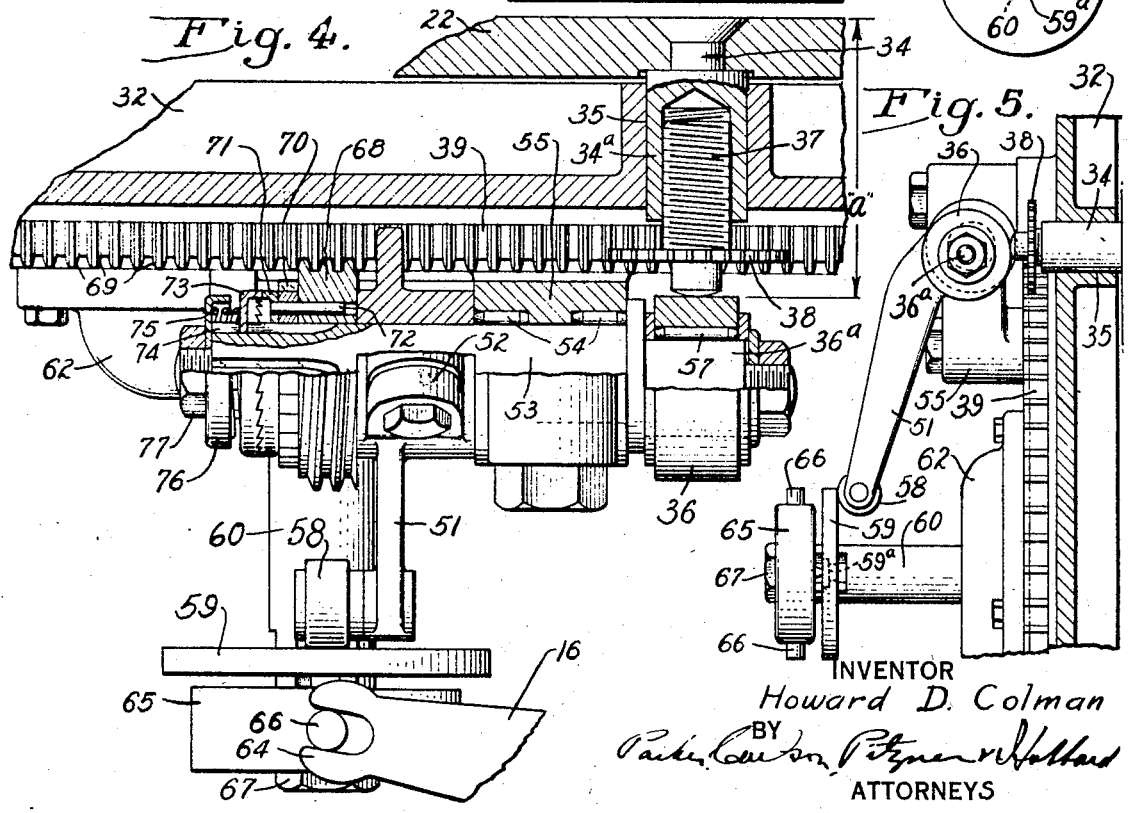
Fig. 4.
Fig. 5.
INVENTOR
Howard D. Colman
BY
ATTORNEYS Patented July 9, 1940

2,207,051

UNITED STATES PATENT OFFICE 2,207,051

CLUTCH MECHANISM

Howard D. Colman, Rockford, Ill., assignor to Barber-Colman Company, Rockford, Ill., a corporation of Illinois Application August 15, 1938, Serial No. 224,936

11 Claims. (Cl. 192—111)

The invention relates to clutches and more particularly to clutches of the friction type.

The general object of the invention is to provide an improved friction clutch for transmitting relatively heavy loads which is easy to manipulate and very compact as well as rugged in construction.

Another object of the invention is to provide a friction clutch embodying an improved and simplified constant-clearance adjustment mechanism for the friction elements.

A more specific object of the invention is to provide a friction clutch embodying an improved constant-clearance adjustment mechanism for the friction elements in which a simultaneous adjustment is made of the connections between a plurality of actuator arms and one of the friction elements.

Still another object of the invention is to provide a friction clutch comprising an improved form of ratchet type adjustment mechanism for retaining a substantially constant idle-position clearance between the friction elements.

Further objects and advantages will become apparent as the following description proceeds taken in connection with the accompanying drawings in which:

Fig. 3 is a partial vertical sectional view along the line 3—3 of Fig. 2.

Fig. 4 is a partial transverse sectional view along the line 4—4 in Fig. 2.

Fig. 5 is a fragmentary side elevation partly in section of the clutch mechanism, illustrating particularly the arrangement of one of the actuator arms.

Fig. 6 is a detail sectional view along the line 6—6 in Fig. 3.

Figure 1:
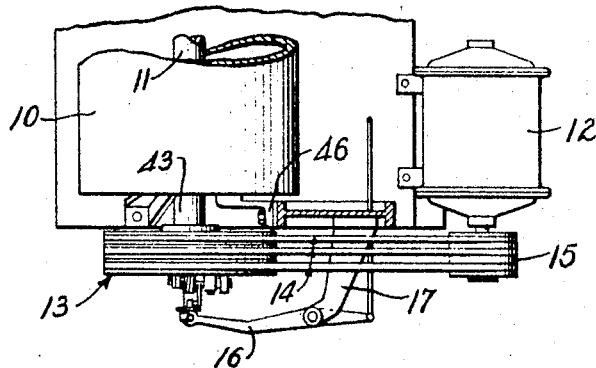
Figure 1 is a plan view of a portion of a warper drum connected to a driving motor therefor through a clutch mechanism embodying the invention.

For purposes of illustration of its various novel features, the invention has been shown herein as embodied in a clutch (Fig. 1) for operatively connecting a warper drum 10 carried on a shaft 11 with its electric driving motor 12. The clutch embodies a driving member designated generally by the numeral 13 which also constitutes an enclosing housing and pulley, which is connected by V-belts 14 with a pulley 15 on the electric motor 12. An actuator lever 16 pivoted on a bracket 17 serves to move the clutch into and out of engaged position.

The clutch has been shown herein (Fig. 3) as being of the single disk type although it may be made in multiple disk form if desired. The clutch illustrated comprises an intermediate driven floating disk or plate 18 having friction rings 19 and 20 disposed on its opposite faces and engageable respectively with annular driving friction rings 21 and 22. The end friction element 21 is fixed against axial movement and the second end element 22 of the series of friction elements is moved axially to clamp the friction rings 19—20 between the end elements 21—22 upon engagement of the clutch.

The driving member 13 embodies (Fig. 3) three concentric cast rings 23—25 secured together by draw bolts 26 which also act as dowels for alining the rings. Grooves 27 in the peripheries of these rings receive the V-belts 14. The end rings 23 and 25 are secured to their respective hubs 28 and 29 by integral radial webs 30 and 31 which are also utilized in cooling the clutch mechanism as is hereinafter described. Ball bearings 28$^a$ and 29$^a$ journal the respective disk hubs 28 and 29 on the shaft 11. A partial enclosure for the front of the clutch mechanism is formed by an integral annular face plate 32 formed on the front ring 25, while an annular sheet metal baffle plate 33 forms a partial rear cover for the clutch mechanism.

Figure 2:
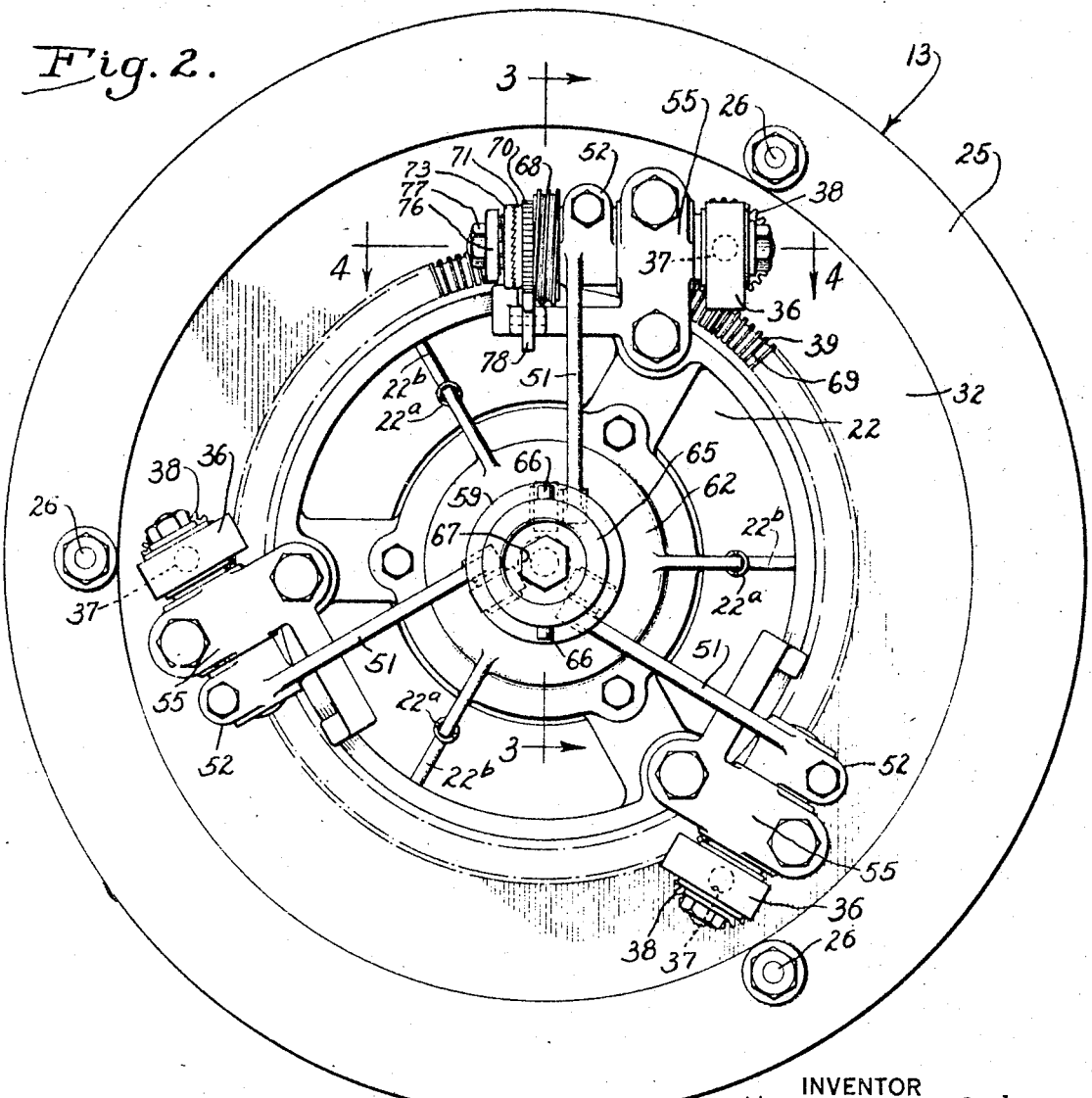
Fig. 2 is an enlarged front elevation of the clutch included in the apparatus of Fig. 1.

The friction ring 21 is shown (Fig. 3) as cast integrally with the radial ribs 30 which support the outer ring 23. The friction ring 22, on the other hand, comprises an annular metal plate supported for axial movement on three studs 34 (Fig. 4) slidably mounted in bores 35 in the end plate 32. Three helical tension springs 22$^a$ (Fig. 2) attached to radial webs 22$^b$ on the rear face of the ring 22 yieldably urge the same axially away from the driven friction element 20. The studs 34 are cammed forward by roller rings 36 journaled on eccentrics 36$^a$, and adapted when rotated to shift the plate 22 axially into engagement with the driven friction element 20 (Fig. 4).

In order to compensate for wear on the friction plates, the studs or stud assemblies 34 are made adjustable in effective length. For this purpose the studs are made up of two generally telescoping parts including centrally bored and tapped pins 34$^a$ fast on the plate 22 and pins 37 threaded in the bores of the pins 34$^a$. The pins 37 are arranged to abut against the rollers 36. By threading the pins 37 in or out of the bores in pins 34$^a$, the overall length $a$ of the studs 34 can be readily adjusted. Simultaneous adjustment of all three of the pins 37 is accomplished by rotating them through the medium of pinions 38 fast thereon and meshing with a ring gear 39. As is hereafter described in greater detail, an arrangement is provided for rotating the ring gear 39 so as to automatically retain a substantially constant selected working clearance between the friction elements.

The driven element of the clutch mechanism includes the intermediate plate 18 carrying the friction elements 19—20. This plate is splined for axial sliding movement on a disk 40 (Fig. 3) which is in turn provided with a hub 41 connected by axial splines 42 with the driven shaft 11.

In assembling the clutch mechanism on the shaft 11, a tubular member 43 (Fig. 3) is interposed between inner race 44 of a ball bearing 45, supporting the shaft 11 on warper frame 46, and the inner race 47 of the ball bearing 28ª on which the outer ring 23 of the clutch housing is journaled. The hub 41 of the intermediate splined disk 40 abuts against the outer or opposite side of the bearing race 47 while the inner race 48 of the ball bearing 29ª abuts against the outer end of this hub 41. This entire assembly of abutting parts is held against a shoulder 49 on the shaft 11 by a pair of locking rings 50 threaded on the outer end of the shaft. By virtue of this arrangement axial thrust on the hubs 28, 29 or 41, incident to engagement of the clutch, is transmitted through the sleeve 43 to the bearing 45 and finally to the warper frame 46. As a result, the shaft 11 is itself relieved of axial thrust.

The actuating mechanism for the clutch comprises three relatively long arms 51 which are arranged to be swung inwardly in a clockwise direction (as viewed in Fig. 3) to rotate the eccentrics 36ª carrying rollers 36 so that the latter will cam the studs 34 axially inward to engage the friction members of the clutch (Fig. 4). For this purpose, the arms 51 are secured by split sleeve clamps 52 to shafts 53, which are in turn journaled by pin bearings 54 in brackets 55 bolted to the face plate 32 on the outer housing ring 25. The roller rings 36 are in turn journaled by pin bearings 57 on the eccentrics 36ª fashioned on the ends of the shafts 53. In order to oscillate the arms 51 in response to movement of the actuating lever 16 (Fig. 3) rollers 58 are provided on the inner ends of the arms which contact a ring or washer 59. This ring is carried by a shaft 60 disposed for rotative and axial sliding movement within a bore 61 in a spider 62, which is bolted to the hub 29 of the outer housing ring 25. For the sake of compactness, the inner end of the shaft 60 is arranged to be received within a bore 63 in the outer end of the driven shaft 11. A forked end or yoke 64 on the actuating lever 16 is pivotally connected by pins 66 to an annular thrust collar 65, which is journaled on the shouldered outer end of the shaft 60 by a ball bearing 65ª. The shaft 60 is notched peripherally at three points (Fig. 6) to form three prongs 60ª between which are loosely fitted complemental central projections on the ring 59. A pointed pin 67, threaded in a bore 67ª, fashioned in the outer end of the shaft 60, forms a central pivotal support for the ring 59. The pointed end of the pin 67 bears against a hardened insert 59ª in the center of the ring 59, and the head of the pin holds the inner race of the ball bearing 65ª against the shoulder on the end of the shaft 60. Accordingly, when the actuating lever 16 is shifted to the left (as viewed in Fig. 3), the shaft 60 is thrust axially inward and the arms 51 are oscillated in a clockwise direction by the contact of the equalizing ring 59 with the rollers 58. In this operation the arms 51 shift from the position shown in full lines in Fig. 3 to the dot-dash line position indicated. The ring 59 is free to pivot about the pointed pin 67 located at its axis and thereby acts as an equalizer to insure an equal application of force to each of the arms 51.

When the clutch mechanism is assembled initially, the friction rings 21 and 22 are carefully arranged in spaced parallel relation and their surfaces are spaced apart a predetermined distance by adjustment of the stud assemblies 34. The ring gear is placed in mesh with the stud adjusting pinions 38 and thereafter any rotation of the ring gear accomplishes a simultaneous adjustment of the stud assemblies. Initially, the faces of the friction rings 19 and 20, on the driven member 18, may not be exactly parallel. Accordingly, when the clutch is closed, the rings 21—22 will engage the rings 19—20 at a point where the latter are thickest. This point of contact may be any place around the circumference of the clutch faces, and as the clutch engages, there is a constant shifting of this point of contact due to the slipping of the clutch so that the point of contact passes successively over the points at which pressure is applied through the stud assemblies 34. If a rigid connection were provided between the actuator lever 16 and the oscillatable arms 51, each of the three arms would be moved through the same distance and all of the pressure in the clutch would be applied at the point of contact between the friction rings. This would be disadvantageous, however, since the driving torque of the clutch is dependent upon the pressure and the area of surface contact and, consequently, the torque in the clutch would gradually increase as the high point was worn down, thereby necessitating constant readjustment of the pressure used to engage the clutch in order to maintain a constant torque. The equalizer connection, including the equalizing ring 59, interposed between the arms 51 and lever 16, overcomes this difficulty. With such an equalizer arrangement and with the high point of contact between the friction rings passing successively the pressure points at the stud assemblies 34, as described above, a small oscillating movement of each of the arms 51 can take place as the point of contact passes them so that substantially equal pressure is always applied to the stud assemblies 34. This small compensating movement of the arms 51 is permitted by the wobbling of the equalizing ring 59 about its pivot 67. Even though the pressure at each of the stud assemblies 34 is maintained substantially constant, there is some increase in pressure at each of them as the high point passes it due to the force required to move the arms 51 as they are passed. Consequently, the high point on the clutch faces soon wears down and the friction surfaces become substantially parallel. In actual practice, there may be several high points on the friction rings which are distributed about the friction surfaces but the action remains substantially the same irrespective of whether the equalizer connection must take care of one or several high points.

An automatic adjustment mechanism is associated with the actuating arms 51 so as to compensate for wear of the friction plates by automatically adjusting the effective lengths of the studs 34. As the surfaces of the plates wear away, the idle position of the plate 22 is changed commensurately by lengthening its supporting studs 34 so that in general a substantially constant displacement of the plate 22 is always used to engage the clutch. A single compensator is used to adjust all of the stud assemblies 34 simultaneously through the medium of the ring gear 39. This compensator maintains a substantially constant working clearance and the equalizer mechanism heretofore described maintains substantially equal distribution of pressure. In the compensator, a ratchet mechanism is provided for rotating the ring gear 39 (Fig. 4) a predetermined increment of distance, to thereby thread the pins 37 out of the bored pins 34a a corresponding distance, whenever the distance through which the actuator shafts 53 must be oscillated in order to engage the clutch members changes a predetermined amount.

In the particular construction illustrated, (Fig. 4) a worm 68 loosely journaled on the shaft 53 meshes with worm gear teeth 69 formed on the outer side of the ring gear 39. This worm is pinned to a peripheral ratchet wheel 70 and a crown ratchet 71 by a pin 72. A crown ratchet driver 73 axially splined to the shaft 53 by a key 74 meshes with the crown ratchet 71. These crown ratchet parts 73 and 71 are urged into engagement by a helical compression spring 75 interposed between an outer face of the member 73 and a retaining cup 76, which is in turn clamped in position against a shoulder on the outer end of the shaft 53 by a nut 77. A backup pawl 78 (Fig. 3) engages the peripheral ratchet wheel 70 in order to prevent reverse movement of the ratchet mechanism.

The teeth of the crown ratchet parts 71 and 73 are so dimensioned in length that the oscillation of the actuator shaft 53, when the friction elements of the clutch are properly spaced, will be insufficient to advance the crown ratchet member 73 from one tooth to the next on the cooperating part 71 during the actuation of the clutch. After the friction elements wear, however, the distance through which the actuator shaft 53 must be oscillated in order to engage them increases until finally the crown ratchet driver 73 advances past a tooth on the ratchet member 71 during the engaging movement of the clutch. Upon the next subsequent disengagement of the clutch, the crown ratchet 71, together with the attached peripheral ratchet wheel and worm 68, are rotated a distance of one crown ratchet tooth. Such rotation of the worm 68 causes the ring gear 39 to be rotated a similar distance, thereby rotating the pinions 38 and threading the abutment pins 37 outwardly a predetermined increment of distance. On subsequent actuations of the clutch, the parts remain in their newly adjusted position until the friction elements finally wear sufficiently to cause another actuation of the ratchet mechanism, at which time the adjustment operation described is repeated.

In order to cool the clutch parts, air is circulated through the mechanism. For this purpose, the spokes or radially projecting webs 30 and 31 (Fig. 3) on the hubs 28 and 29 are fashioned as radially extending impeller blades. The webs 22b on the friction ring 22 also serve as impeller blades. These blades suck air into the clutch housing through openings adjacent the shaft at 79 and 80 and throw it radially outward over the clutch parts. The cooling air is finally discharged through peripheral openings in the clutch housing formed by notches in the adjacent edges of the rings 23—25, as indicated at 81.

Although a particular embodiment of the invention has been shown and described in some detail, there is no intention to limit the invention to such embodiment, but on the other hand the appended claims are intended to cover all modifications and alternative constructions within the spirit and scope of the invention.

I claim:

1. A clutch mechanism comprising, in combination, a series of coaxial friction disks disposed in face to face spaced relation, one end disk of said series being fixed against axial movement, the second end disk of said series having a plurality of spaced stud assemblies fast on the outer face thereof projecting outwardly and lying on the circumference of a circle coaxial with said disks, means supporting said stud assemblies for axial sliding movement to afford movement of said second end disk toward and away from said fixed end disk for engagement and disengagement of said series of friction disks, each of said stud assemblies including a stud fast on said second end disk and an abutment threaded thereon for adjustment axially of the associated stud, means for yieldably urging said second end disk axially away from said fixed disk, means including a plurality of oscillatable arms engageable with said abutments for pushing said stud assemblies axially to shift said friction disks into engagement, a pinion on each of said abutments, a ring gear meshing with each of said pinions, and means for rotating said ring gear to adjust the effective axial length of each of said stud assemblies substantially simultaneously to compensate for wear of the active surfaces of said friction disks.

2. A clutch mechanism comprising, in combination, a series of friction elements disposed in spaced relation and mounted for rotation about a common axis, one end element of said series being fixed against axial movement, the second end element of said series having a plurality of spaced stud assemblies fast on the outer end thereof projecting outwardly and lying on the circumference of a circle coaxial with said common axis, means supporting said stud assemblies for axial sliding movement to afford movement of said second end element toward and away from said fixed end element for engagement and disengagement of said series of friction elements, each of said stud assemblies including a stud fast on said second end element and an abutment threaded thereon for adjustment axially of the associated stud, means yieldably urging said second end element axially away from said fixed element, means including a plurality of oscillatable arms engageable respectively with said abutments for pushing said stud assemblies axially to shift said elements into engagement, a pinion on each of said abutments, a ring gear meshing with each of said pinions, and means responsive to the amplitude of movement of at least one of said arms required to shift said elements into engagement for rotating said ring gear to adjust the effective axial lengths of said stud assemblies substantially simultaneously to compensate for wear of the active surfaces of said friction elements.

3. A clutch mechanism comprising, in combination, a plurality of engageable friction elements mounted for movement into and out of engagement, a centrally disposed actuator, means including a plurality of radially disposed oscillatable arms for connecting said actuator with said elements, said last named means also including means for equalizing the pressure exerted on said arms by said actuator, individually adjustable connections between the outer portions of said arms and said elements, and means responsive to the amplitude of movement of at least one of said arms required to shift said elements into engagement for simultaneously adjusting all of said adjustable connections in response to a movement by said one of said arms in excess of a predetermined amount.

4. In a clutch mechanism the combination with a plurality of engageable friction disks, and means responsive to a change in working clearance between said disks for adjusting the clearance therebetween simultaneously at a plurality of points about their surfaces, of means for applying equalized pressures to said elements at a plurality of points for shifting the same into engagement.

5. A clutch mechanism comprising, in combination, a plurality of engageable friction elements mounted for movement into and out of engagement, a centrally disposed actuator, means including a plurality of radially disposed oscillatable arms for connecting said actuator with said elements, individually adjustable connections between the outer portions of said arms and said elements, and means responsive to the amplitude of movement of at least one of said arms required to shift said elements into engagement for substantially simultaneously adjusting said adjustable connections to retain such amplitude of movement substantially constant.

6. In combination, a plurality of engageable clutch elements mounted for movement into and out of engaged position, actuator means for effecting relative movement between said elements from a disengaged to an engaged position, said means including two members relatively adjustable in the direction of their path of movement, and means responsive to the amplitude of movement required to shift said elements from disengaged to engaged position for adjusting said members relative to each other.

7. The combination with a clutch mechanism embodying a plurality of engageable friction elements and an actuator therefor including a shaft oscillatable through an arc proportionate to the clearance between the engaging surfaces of said elements, of an automatic constant-clearance maintenance device for said elements comprising a crown ratchet driver fast on said shaft, a complemental crown ratchet driven gear loosely journaled on said shaft, means for yieldably urging said driven gear into engagement with said driver, the teeth on said ratchet member being dimensioned to permit an advance of one tooth for said driver with respect to said driven gear only when the oscillation of said clutch actuator shaft exceeds the oscillation thereof required for shifting said friction elements when the clearances therebetween are normal, and means operatively connected to said driven ratchet gear for adjusting the clearance between said elements upon an advance of said driven gear by said ratchet driver.

8. The combination with a clutch mechanism embodying a plurality of engageable friction elements and an actuator therefor including a shaft oscillatable through an arc proportionate to the clearance between the engaging surfaces of said elements, of an automatic constant-clearance maintenance device for said elements comprising a crown ratchet driver fast on said shaft, a complemental crown ratchet driven gear loosely journaled on said shaft, means for yieldably urging said driven gear into engagement with said driver, the teeth on said ratchet member being dimensioned to permit an advance of one tooth for said driver with respect to said driven gear only when the oscillation of said clutch actuator shaft exceeds the oscillation thereof required for shifting said friction elements when the clearances therebetween are normal, rotatably adjustable means for adjusting the clearance between said friction elements, a worm fast on said driven ratchet gear and means including a worm wheel meshing with said worm for rotating said adjusting means upon an advance of said driven gear by said ratchet driver.

9. A clutch mechanism comprising, in combination, a series of friction elements disposed in face to face spaced relation and mounted for rotation about a common axis, one end element of said series being fixed against axial movement, the second end element of said series having a plurality of spaced stud assemblies fast on the outer face thereof projecting outwardly therefrom and lying on the circumference of the circle coaxial with said common axis, means supporting said stud assemblies for axial sliding movement to afford movement of said second end element toward and away from said first end element for respective engagement and disengagement of said series of friction elements, each of said stud assemblies including a stud fast on said second end element and an abutment threaded thereon for adjustment axially of the associated stud, means for yieldably urging said second end element axially away from said fixed end element, means including a plurality of oscillatable arms engageable respectively with said abutments for pushing said stud assemblies axially to shift said elements into engagement, a pinion on each of said abutments, a ring gear meshing with each of said pinions, a crown ratchet driver fast on one of said oscillatable arms, a complemental crown ratchet driven gear meshing with said ratchet drivers, the teeth on said ratchet members being dimensioned to permit an advance of one tooth for said driver with respect to said driven gear only when the oscillation of said oscillatable arm is in excess of the oscillation thereof required for shifting said friction element into engagement when the clearance therebetween is normal, and means including a worm fast on said ratchet driven gear and meshing with worm wheel teeth fashioned on said ring gear for rotating said ring gear to adjust the positions of said abutments with respect to said studs upon an advance of said driven ratchet gear by said ratchet driver.

10. A clutch mechanism comprising a series of friction clutch elements rotatable about a common axis and movable relative to each other generally longitudinally of such axis into and out of engagement, and characterized by the inclusion of a series of structurally separate pulley rings having belt grooves in their peripheries and fixed together coaxially in face-to-face relation for rotation about said common axis with the end rings in the series arranged to carry the end elements in the series of friction elements and the intermediate ring or rings in the series completing between the end rings a circumferential housing for said friction elements.

11. A clutch mechanism comprising, in combination a rotatable shaft having an axial bore in one end, a plurality of clutch elements rotatable about an axis coincident with that of the shaft and movable generally longitudinally of the shaft into and out of engagement, means for shifting said elements relatively for controlling their engagement and including a plurality of oscillatable levers disposed radially of the shaft with their inner ends adjacent the bored end of the shaft, a plunger slidable in said bore, a thrust collar rotatably journaled on said plunger, an actuating lever operatively connected to said collar, a pointed projection on the outer portion of said plunger pointing inwardly and axially of the same, and an equalizer plate positioned to be engaged at the center of its outer face by said projection and on its inner face by said inner ends of said oscillatable levers at points spaced laterally outward from said pointed projection.

HOWARD D. COLMAN.